(12) United States Patent
Wernersson

(10) Patent No.: US 7,697,062 B2
(45) Date of Patent: Apr. 13, 2010

(54) CAMERA AND METHOD IN A CAMERA

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 447 days.

(21) Appl. No.: 11/625,128

(22) Filed: Jan. 19, 2007

(65) Prior Publication Data

US 2008/0106636 A1    May 8, 2008

Related U.S. Application Data

(60) Provisional application No. 60/864,891, filed on Nov. 8, 2006.

(51) Int. Cl.
*H04N 5/222* (2006.01)
*H04N 9/73* (2006.01)

(52) U.S. Cl. .................... 348/371; 348/224.1

(58) Field of Classification Search .......... 348/370, 348/371, 224.1
See application file for complete search history.

(56) References Cited

U.S. PATENT DOCUMENTS

| | | | | |
|---|---|---|---|---|
| 6,069,659 | A * | 5/2000 | Nakajima | 348/371 |
| 7,345,702 | B2 * | 3/2008 | Kawahara | 348/234 |
| 7,394,488 | B2 * | 7/2008 | Dalton et al. | 348/223.1 |
| 7,414,666 | B2 * | 8/2008 | Yamaguchi, Kazunari | 348/371 |
| 2001/0019364 | A1 | 9/2001 | Kawahara | |
| 2003/0107656 | A1 * | 6/2003 | Ito et al. | 348/216.1 |
| 2003/0107669 | A1 * | 6/2003 | Ito et al. | 348/370 |
| 2003/0189665 | A1 * | 10/2003 | Yamada | 348/370 |
| 2004/0017505 | A1 * | 1/2004 | Yamauchi | 348/370 |
| 2005/0157207 | A1 | 7/2005 | Voss et al. | |
| 2006/0044422 | A1 | 3/2006 | Miyazaki | |
| 2007/0165960 | A1 * | 7/2007 | Yamada | 382/254 |
| 2007/0263119 | A1 * | 11/2007 | Shum et al. | 348/371 |
| 2008/0165265 | A1 * | 7/2008 | Chiba et al. | 348/308 |

FOREIGN PATENT DOCUMENTS

EP    1 387 562 A2    2/2004

* cited by examiner

*Primary Examiner*—Sinh Tran
*Assistant Examiner*—Dillon Durnford-Geszvain
(74) *Attorney, Agent, or Firm*—Harrity & Harrity, LLP

(57) ABSTRACT

The present invention relates to a method in a camera for determining a camera setting when using pulsed flash is provided. The camera comprises a source of light. The source of light is adapted to emit light to illuminate an object. The object is further illuminated by ambient light. The method comprises the steps of: Capturing a first image data of the object when the object is illuminated by light emitted by the source of light and by the ambient light, capturing a second image data of the same object when the object is illuminated by the ambient light but not by light from the source of light, creating a difference image data by subtracting the second image data from the first image data. The method comprises the further step of determine a camera setting based on the created difference image data. The determined camera setting is to be used when capturing a third image of the object, using emitted pulsed flash by the source of light to illuminate the object.

21 Claims, 4 Drawing Sheets

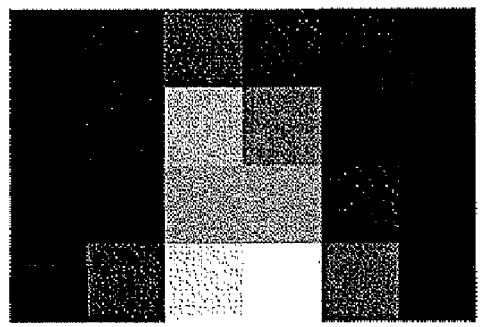
Fig. 5
 
Fig. 6a                    Fig. 6b

CAMERA AND METHOD IN A CAMERA

RELATED APPLICATION

This application claims priority under 35 U.S.C. §119 based on U.S. Provisional Application Ser. No. 60/864,891, filed Nov. 8, 2006, the disclosure of which is incorporated herein by reference.

BACKGROUND

1. Technical Field

The present invention relates generally to a camera and a method in a camera. In particular it relates to the determination of camera settings when using pulsed flash.

2. Description of Related Art

Camera phones usually have a white Light Emitting Diode (LED) for illumination of an object in dark environments. The light output from an LED is very low which makes it necessary to use long exposure times. Long exposure time is a problem as hand shake of the user results in blurred images. Recent technical progress has made more powerful LEDs available. These LEDs can produce a good amount of light even at short pulses. It is also possible to reach higher light levels with short pulses as power dissipation limits the efficiency of an LED The brightness of an object depends on both ambient light and the light coming from the LED. The effect of the LED varies depending on the distance to the object and the reflectivity of the object. Hence it is difficult to adjust the camera for correct exposure as these conditions are normally not known.

The camera automatically adjusts the exposure settings when a continuous lighting LED is used. This is possible since the camera can capture several image frames when the LED is lit and adjust accordingly. This method is not possible to use with a pulsed LED as the brightness of the object will come as a total surprise.

One way to solve this problem is to regulate the LED power the same way a Xenon flash is regulated. A light sensor integrates the reflected light from the object and an electronic circuit turns off the flash when a predefined light flux is reached.

There are however some disadvantages with this solution. The predefined flux must be set at a level low enough to ensure enough flux at the maximum desired range of the device. The effect will be that we only take full advantage of the LEDs capabilities when it is used at its maximum working range. This would be to waste performance in most cases.

For example, if the maximum working range is set to 2 meters, only 25% of the LEDs potential will be used at 1 meter.

Yet another problem has to do with white balancing. A typical indoor environment is illuminated by tungsten bulbs having a colour temperature of about 2800 K (very reddish compared to daylight). A typical white LED has a colour temperature of about 7000 K. White balancing becomes very difficult as we don't know to what extent the LED contributes to the total illuminating of the scene.

Ideally the LED should always be used at maximum power and the camera exposure setting (gain and exposure time) should be adjusted to match the circumstances.

SUMMARY

Implementations of the invention provide a camera with an enhanced camera setting function.

According to a first aspect of the present invention, a method in a camera for determining a camera setting when using pulsed flash is provided. The camera may include a source of light. The source of light is adapted to emit light to illuminate the object. The object is further illuminated by ambient light. The method may include the steps of: Capturing a first image data of the object when the object is illuminated by continuous light emitted by the source of light and by the ambient light, capturing a second image data of the same object when the object is illuminated by the ambient light but not by light from the source of light, creating a difference image data by subtracting the second image data from the first image data. The method may include the further step of determine a camera setting based on the created difference image data. The determined camera setting is to be used when capturing a third image of the object, using emitted pulsed flash by the source of light to illuminate the object.

According to a second aspect of the present invention, a camera including a source of light is provided. The source of light is adapted to emit light to illuminate an object. The camera further comprises an image capturing unit adapted to capture an image of the object in the form of image data. The image capturing unit is adapted to capture a first image data of the object being illuminated by continuous light emitted by the source of light and the object being illuminated by the ambient light. The image capturing unit is further adapted to capture a second image data of the same object being illuminated by the ambient light but not by light from the source of light. The camera further comprises an image processing unit adapted to create a difference image data by subtracting the second image data from the first image data. The camera further comprises a camera setting unit adapted to determine a camera setting based on the created difference image data, which determined camera setting is to be used when capturing a third image of the object, using emitted pulsed flash to illuminate the object.

Since the difference image data is created by subtracting the second image data from the first image data, the isolated effect of the source of light is established, which is an important basis for determine camera settings when using the source of light for pulsed flash.

An advantage of the present invention is that better images can be captured.

Another advantage of the present invention is that the full potential of a white LED as a light source can be used.

BRIEF DESCRIPTION OF THE DRAWINGS

In the drawings:

FIG. 5 is the image of FIG. 4 divided into a matrix;

FIG. 6a is a zone image;

FIG. 6b is an image wherein a threshold is applied to the zone image of FIG. 6a.

DETAILED DESCRIPTION

Figure 1:
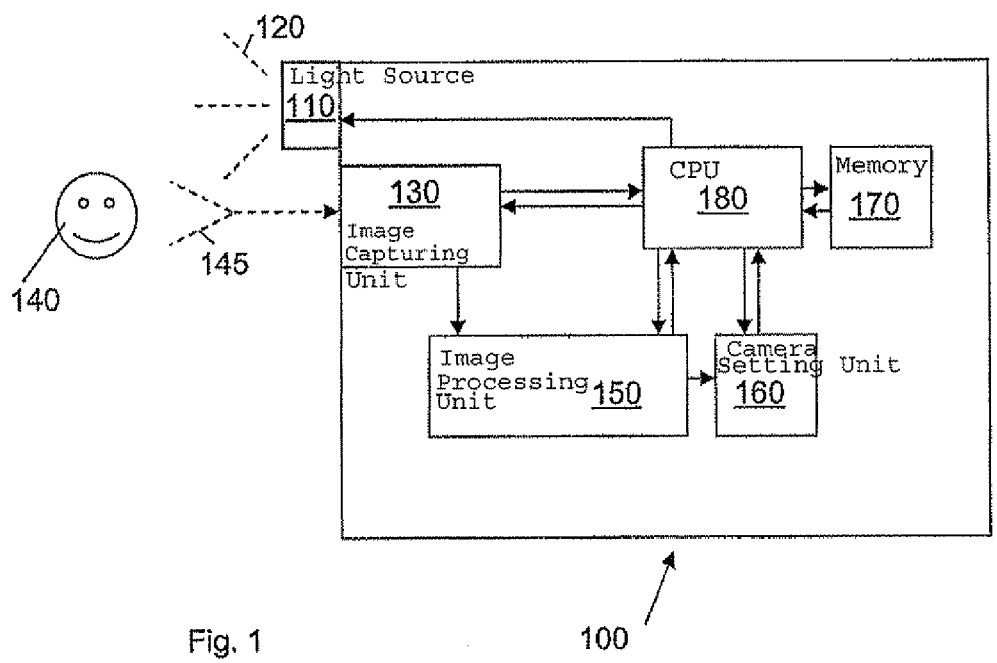
FIG. 1 is a schematic block diagram illustrating a camera.

FIG. 1 depicts a camera 100, which camera 100 may include a portable electronic device such as e.g. a mobile terminal. Camera 100 may include a source of light 110. Source of light 110 may be adapted to emit the pulsed flash and also to emit continuous light. The term continuous light is in this document defined as light emitted under a period that is longer than the time it takes to take a picture, preferably several seconds, e.g. 2 seconds. The continuous light mode may be used in order to facilitate view finding to help the user to be able to aim the camera. In this mode source of light 110 may be lit for typically several seconds at relatively low power as power consumption and heat dissipation otherwise would be a problem. Source of light 110 may as an alternative emit a short pulse of light for measurement purposes, e.g., combined with a red eye reduction function, either in conjunction with continuous view finder light or alone. A low power continuous view finder light is advantageous as longer integration times and higher gain settings are acceptable in view finder mode than when capturing a high resolution still image. The emitted light from source of light 110 is represented by dashed lines 120 in FIG. 1. As an alternative embodiment, camera 100 may further comprise a second source of light. In this alternative case the source 110 of light may be adapted to emit the pulsed flash and the second source of light may be adapted to emit continuous light. However, in the following description the invention is described and discussed in relation the embodiment with one source of light 110. Source of light 110 and second source of light where appropriate, may be represented by a light emitting diode (LED), or any other suitable source of light such as an electric light bulb.

Camera 100 further may include an image capturing unit 130 adapted to capture an image of an object 140 in the form of image data. The capturing is represented by dashed lines 145 in FIG. 1.

Figure 2A:
FIG. 2a is an image captured using ambient light only.
Figure 2B:
FIG. 2b is an image of the same object as in FIG. 2a, but captured with the same ambient light as in FIG. 2a plus continuous light from the camera.

FIG. 2a depicts an image of an object captured with ambient light only and FIG. 2b depicts an image of the same object as in FIG. 2a, but captured with the same ambient light as in FIG. 2a plus continuous light emitted by source of light 110 which in this example is represented by a low powered LED.

Figure 3A:
FIGS. 3a and 3b are images corresponding to the images in FIGS. 2a and 2b, but in brighter ambient lighting conditions.
Figure 3B:

FIG. 3a and FIG. 3b depicts images corresponding to the images in FIGS. 2a and 2b, but in brighter ambient lighting conditions. FIG. 3a depicts an image of an object captured with the brighter ambient light only and FIG. 3b depicts an image of an object captured with the same brighter ambient light plus continuous light emitted by source of light 110 which also in this example is represented by a low powered LED.

The ambient light is very weak in the example in FIGS. 2a and 2b while it is relatively strong in example in the FIGS. 3a and 3b. This illustrates the difficulty in predicting the brightness of the object when the continuous light emitted by source of light 110 is used. In FIGS. 2a and 2b, the effect of the continuous light emitted by source of light 110 is strong, while it is very weak in FIGS. 3a and 3b. Note in FIGS. 2a and 2b that the right part of the wall is quite well illuminated by the ambient light and the additional light from the continuous light emitted by source of light 110 makes just a small difference.

Both examples in FIGS. 2 and 3 show the effect of a continuous light emitted by source of light 110 used for view finding. If a picture is to be taken using pulsed flash emitted by source of light 110 at much higher power, the brightness of the scene must be determined to set the exposure settings. It must be taken into account that not all parts of the image will be equally illuminated by source of light 110, e.g. due to variations in distance.

Continuous light from a source of light of a camera is commonly used to illuminate an object for view finding before taking the picture. Typically the source of light of the camera is used at a much lower power than its potential maximum (e.g. 10-20% of maximum). The source of light of a camera is used at a low power level to conserve energy, to avoid overheating and to spare the eyes of a photographed person.

To adjust camera settings in camera 100 in a more accurate way before capturing an image of object 140 when pulsed flash is to be used, knowledge of what the image would look like if light was emitted by source of light 110 but no ambient light was available, is required. I.e. the effect of the light emitted by source of light 110 is required. This is necessary as the relative contribution of light to the scene from the source of light 110 is smaller if the ambient light is strong compared to if the ambient light is weak. Therefore a difference image is created comprising difference image data.

To create the difference image data, image capturing unit 130 captures a first image data of object 140, using emitted light emitted by source of light 110. The emitted light may preferably be continuous light, and may preferably be used at low power such as in view finder mode mentioned above. Object 140 is accordingly illuminated by both ambient light and light emitted from source of light 110 of camera 100.

Further, image capturing unit 130 captures a second image data of the same object 140, but without using any emitted light from source of light 110. That is, in this case object 140 is illuminated only by ambient light. The first image and second image may be captured in any order, since the order is of no importance for the invention.

Camera 100 further may include an image processing unit 150. Image processing unit 150 creates the difference image data by subtracting the second image data from the first image data, i.e. by subtracting the second image illuminated by the ambient light, from the first image illuminated by both the ambient light and continuous light emitted from camera 100. This difference image data thus represents the effect of the used emitted light only.

Figure 4A:
FIG. 4a is a difference image applied to the images of the example in FIG. 2.
Figure 4B:
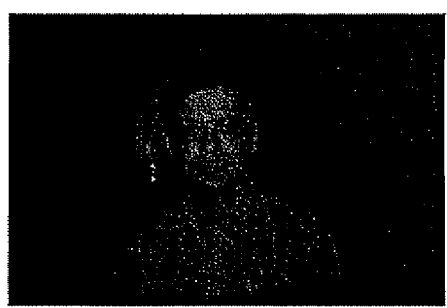
FIG. 4b is the same difference image as in FIG. 4a, but amplified.

FIGS. 4a and 4b shows a difference image applied to the images of the example in FIG. 2 above, i.e. the image of FIG. 2a is subtracted from the image of FIG. 2b. FIG. 4a depicts the difference image of the example in FIG. 2 and FIG. 4b depicts the same image amplified to visualize the effect. This difference image of FIG. 4 represents what the image would look like if the ambient light was not present but only light emitted by source of light 110 was present.

Camera 100 further may include a camera setting unit 160, adapted to determine exposure settings and other camera settings for camera 100, such as e.g. exposure time, aperture, image sensor gain, white balance settings and setting the emitting light of source of light 110. The camera setting unit 160 then determines one or more camera settings based on the created difference image data. The determined camera settings are to be used when capturing a third image using pulsed flash, i.e. the image the user of camera 100 really wish to capture. Preferably, the determination is performed on linear image data. The original image data is linear while processed image data is nonlinear as a gamma curve is applied to the data.

The difference image data may be used as a base for selecting which parts of the image that is of interest when determining the exposure settings for camera 100. As an example, the difference image data may be used for determining the extent of the light that is reflected from object 140. This information may be used when the exposure setting is determined. The altered settings can be sensor gain, aperture, power of source of light 110 such as LED power or any other setting that will affect the brightness levels of the output image.

When continuous light emitted light emitted by source of light 110 is used when capturing the first image data of object 140, the ratio between the continuous and pulsed flash is known as the ratio does not change. The ratio is established by the amount of electrical power that is applied to source of light 110 and may therefore be accurately controlled. The intensity of reflected light will change due to the circumstances (distance to the scene, scene reflectance etc.). Thus, if the reflected light from the continuous emitted light can be measured, the reflected light from the pulsed emitted light can be determined.

This determination may be performed by multiplying the difference image data with the power ratio between the low powered emitted continuous light and the high powered emitted pulsed flash, and then adding the second image data only, i.e. the data of the ambient light image. This may be performed by e.g., image processing unit 150 or any other suitable unit within camera 100.

The light emitted by source of light 110 has a large effect on objects at a short distance while objects at a long distance are almost unaffected. Hence it becomes important to adjust the exposure settings in order to achieve the desired brightness levels in the image at short distances while disregarding parts of the image that represents objects far away.

The difference image can be divided in a number of zones, preferably small number of zones such as e.g., a matrix of 6 by 4 squares, to facilitate the determinations. FIG. 5 shows what the image from FIG. 4 looks like if it was divided into a matrix of 6 by 4 squares. Each square holds the average value of brightness values of the image part it represents. FIG. 5 is amplified for visualization.

The present method may solve the problem of predicting not only the brightness of the object when illuminated at full source of light 110 power but also the spatial distribution of reflected light in the particular situation. To determine which zones that should be used for exposure evaluation, a zones of interest image is created. The second image (i.e. the ambient light image) is divided in zones the same way as the difference image. A zones of interest image is created by dividing the zone divided difference image with the zone divided second image. This operation will identify the zones that are most affected by the light emitted by source of light 110 as it shows the ratio between the ambient light and the light emitted by source of light 110 rather than just the difference. This may be performed by e.g. image processing unit 150 or any other suitable unit within camera 100. The zones of interest image will show the parts of the object that will be most affected by light emitted by source of light 110. A zones of interest image is depicted in FIG. 6a, which image is amplified for visualization. To decide which of the zones being of interest, a threshold value is applied to the zones of interest image such that the zones of the difference image data exceeding the threshold value are to be used as a basis for determining the camera settings. FIG. 6b depicts an image wherein a threshold is applied to the zones of interest image of FIG. 6a to sort out the zones of interest, wherein the white zones represent the zones of interest. Establishing exact target values in imaging systems typically involves a lot of experimental work as the desired result is judged by the human eye. The desired result depends on artistic and subjective evaluated qualities. Hence the exact threshold value should be established by experimental methods to reach the desired outcome. It can however be noted that the threshold values may be expected to be relatively low (e.g., typically below 100 on a 1024 unit scale of image brightness values). The data from the zones of interest will of course come from the difference image and the ambient light image but only from the zones indicated interesting (being white in FIG. 6b).

The color temperature of white sources of light, such as LEDs, typically varies over a big range due to manufacturing difficulties. These variations will result in badly white balanced images if the problem is not addressed. A typical way of coping with this problem in the prior art is to measure and sort sources of light into batches with similar color properties, which is cumbersome and expensive.

The present method makes this sorting unnecessary while achieving even higher accuracy in white balancing, as the problem of variations of color temperature of an individual source of light may be solved by storing the color characteristics of the individual source of light 110 in a memory 170 in e.g. camera 100, or if the camera is comprised in a host, the memory may be comprised in the host of camera 100 such as e.g., a portable electronic device or a mobile terminal. This data may be stored in memory 170 by a calibration process in the manufacturing of camera 100, portable electronic device or mobile terminal. This calibration will enhance the image quality of the images captured by camera 100 and allows for larger tolerances of the color characteristics of source of light 110, which implies a lower cost as described above. The zones of interest image may be used as a basis for setting the white balance in camera 100 such that the setting the white balance is based only on the values of the zones of interest exceeding threshold value together with the stored color characteristics of source of light 110. To know the color temperature of light source 110 is of great value when performing auto white balancing. As the above mentioned method provides information of which parts of the image that are most affected by ambient light versus light emitted by source of light 110, it provides a better ground for establishing good color rendition compared to a method that depends on an average value of the entire image. If, for example the calculations based on the difference and zones of interest images shows that light emitted by source of light 110 will be dominating, the white balance algorithm can decide to use a fixed white balance setting based on the stored value of the color characteristics of the individual source of light 110.

Figure 7:
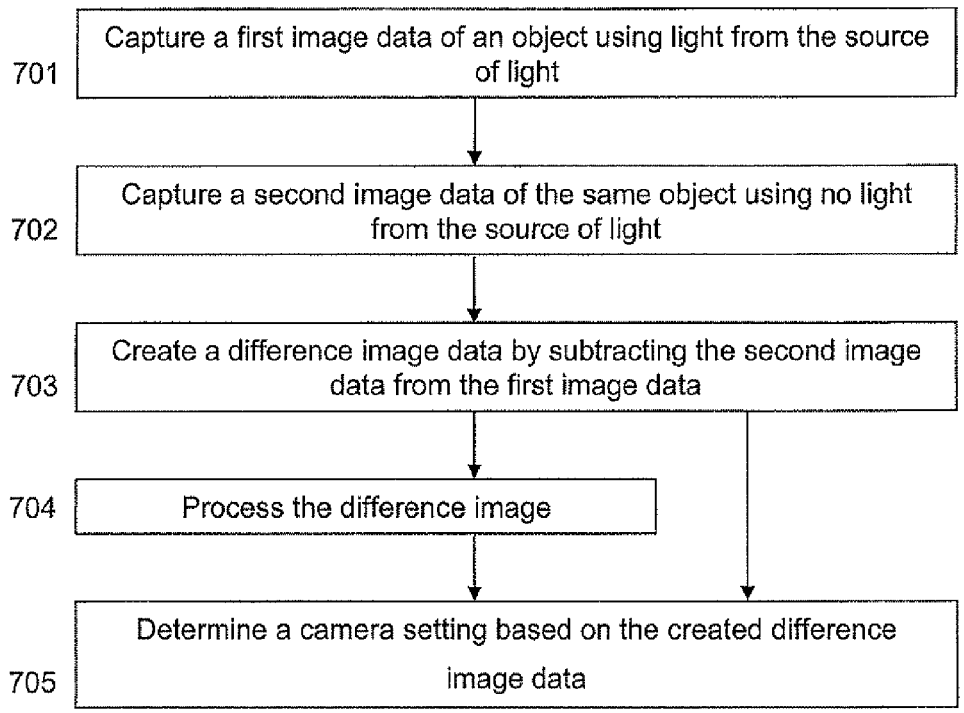
FIG. 7 is a flowchart illustrating a method in the camera.

The present method steps in camera 100 for determining a camera setting when using pulsed flash will now be described with reference to a flow chart depicted in FIG. 7. The camera 110 may be comprised in a portable electronic device or in a mobile terminal. The method may include the steps of:

701. A first image data of object 140 is captured when object 140 is illuminated by light emitted by source of light 110 and by the ambient light. The continuous light emitted by source of light 110 may be continuous and may be used at low power when the first image is captured.

702. A second image data of the same object 140 is captured when the object is illuminated by the ambient light but not by light from source of light 110.

703. A difference image data is created by subtracting the second image data from the first image data. The difference image may be divided into a number of zones, wherein each zone holds the average value of brightness values of the image part it represents.

704. In this step the difference image may be processed, e.g. by image processing unit 150, before determining any camera setting. The difference image data may e.g. be used for determining the extent of the light that is reflected from object 140. In that case the difference image data is multiplied with the power ratio between the continuous light and the high powered emitted pulsed flash which then is added to the data of the second image data. In another embodiment the second image is divided into a number of zones, wherein each zone holds the average value of brightness values of the image part it represents, and a zones of interest image is created by dividing the zone divided difference image with the zone divided second image. A threshold value may be applied to the zones of interest image, such that the zones comprising image data exceeding the threshold value are to be used as a basis for determining the camera settings.

705. The camera setting is determined based on the created difference image data, which determined camera setting is to be used when capturing a third image of the object, using emitted pulsed flash to illuminate the object. The camera setting may be represented by setting of the exposure time, aperture, image sensor gain, white balance and/or the emitting light of the source of light. In one embodiment the color characteristics of the source of light is stored the in a memory of the camera or any host of the camera such as a portable electronic device or a mobile terminal, and the camera setting to be determined is the white balance. In this case, the determination of the white balance is based on the values of the zones of interest exceeding the threshold value together with the stored color characteristics of the source of light.

Camera 100 will now be described from the point of view of different parts and units in camera 100 used to perform the method steps for determining a camera setting when using pulsed flash as also depicted in FIG. 1.

Camera 100 may include source of light 110, which source of light is adapted to emit light to illuminate an object 140. Source of light 110 is adapted to emit pulsed flash to illuminate object 140 and may be adapted to emit continuous light to illuminate object 140. The source of light may be represented by a LED.

The camera further may include an image capturing unit 130 adapted to capture an image of object 140 in the form of image data. Image capturing unit 130 is further adapted to capture a first image data of object 140 being illuminated by light emitted by the source of light 116 and object 140 being illuminated by the ambient light. The source of light may be adapted to emit continuous light and may be is used at low power when the first image is captured. Image capturing unit 130 is further adapted to capture a second image data of the same object being illuminated by the ambient light but not by light from source of light 110.

Camera 100 further may include an image processing unit 150 adapted to create a difference image data by subtracting the second image data from the first image data. Image processing unit 150 may further be adapted to multiply the difference image data with the power ratio between the continuous light and the high powered emitted pulsed flash, and then adding the data of the second image data. In one embodiment image processing unit 150 further is adapted to divide the difference image in a number of zones, wherein each zone holds the average value of brightness values of the image part it represents. In another embodiment image processing unit 150 is adapted to create a fourth image by dividing the difference image with the second image, and to create zones of interest image by dividing the fourth image into a number of zones. In this embodiment image processing unit 150 may further be adapted to apply a threshold value to the zones of interest image such that the zones comprising image data exceeding the threshold value are to be used as a basis for determining the camera settings.

Camera 100 further comprising a camera setting unit 160 adapted to determine a camera setting based on the created difference image data. The determined camera setting is to be used when capturing a third image of object 140, using emitted pulsed flash to illuminate the object. The camera settings may be represented by the setting of exposure time, aperture, image sensor gain, white balance and/or the emitting light of the source of light. Camera 100 may further comprise a memory 170 being adapted to store color characteristics of source of light 110. In this case the camera setting to be determined may be the white balance and the camera setting unit may then be further adapted to base the determination of the white balance on the values of the zones of interest exceeding the threshold value together with the stored color characteristics of the source of light.

Figure 8:
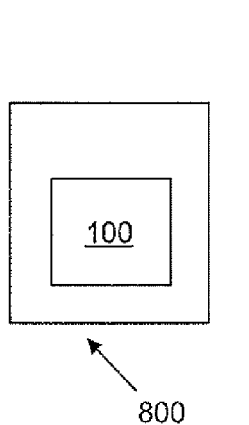
FIG. 8 is schematic block diagram illustrating portable electronic device comprising a camera.
Figure 9:
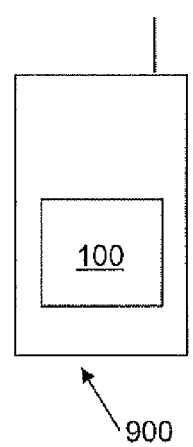
FIG. 9 is schematic block diagram illustrating mobile terminal comprising a camera.

Camera 100 may be comprised in a portable electronic device 800 as depicted in FIG. 8 or in a in a mobile terminal 900 as depicted in FIG. 9.

The present camera setting mechanism can be implemented through one or more processors, such as the processor 180 in camera 100 depicted in FIG. 1, together with computer program code for performing the functions of the invention. The program code mentioned above may also be provided as a computer program product, for instance in the form of a data carrier carrying computer program code for performing the present method when being loaded into camera 100. One such carrier may be in the form of a CD ROM disc. It is however feasible with other data carriers such as a memory stick. The computer program code can furthermore be provided as pure program code on a server and downloaded to camera 100 remotely.

It should be emphasized that the terms, "comprises/comprising" and/or "includes/including," when used in this specification is taken to specify the presence of stated features, integers, steps or components but does not preclude the presence or addition of one or more other features, integers, steps, components or groups thereof.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. In a camera arrangement including a light source configured to emit light to illuminate an object, a method comprising:
   capturing first image data of the object when the object is illuminated by continuous light emitted by the light source and by ambient light;
   capturing second image data of the object when the object is illuminated by the ambient light and substantially without light from the light source;
   subtracting the second image data from the first image data to form difference image data;
   multiplying the difference image data with a power ratio between the continuous light and a pulsed flash, emitted from the light source, to form a product; and
   adding the product to the second image data; and
   determining, based on the difference image data, a setting for a pulsed flash from the light source to be used when capturing a third image of the object in the ambient light.

2. The method of claim 1, further comprising:
   dividing the difference image data into a number of zones to form a first zone-divided difference image, where each zone corresponds to an average value of brightness values associated with a portion of the difference image data.

3. The method of claim 2, further comprising:
dividing the second image data into a number of zones to form a second zone-divided difference image, where each zone corresponds to an average value of brightness values associated with a portion of the second image data; and
dividing the first zone divided-difference image by the zone-divided second image to form a zones-of-interest image.

4. The method of claim 3, further comprising:
applying a threshold value to the zones-of-interest image, where the determining the setting for the pulsed flash is based on zones having image data that exceed the threshold value.

5. The method of claim 4, where color characteristics of the light source are stored in a memory of the camera arrangement, the determining the setting for the pulsed flash comprising determining white balance based on values of the zones-of-interest exceeding the threshold value together with the stored color characteristics of the light source.

6. The method of claim 1, where the light source comprises a light emitting diode.

7. The method of claim 1, where determining the setting for the pulsed flash is further based on at least one of exposure time, aperture parameters, image sensor gain, white balance, or emitting light from the light source.

8. The method of claim 1, where the light source is used at low power during the capturing of the first image data.

9. The method of claim 1, where the camera arrangement resides in a portable electronic device.

10. The method of claim 1, where the camera arrangement resides in a mobile terminal.

11. A non-transitory computer-readable medium including instructions for execution by a processor in a camera arrangement including an illumination device, the instructions comprising:
instructions to capture first image data of an object when the object is illuminated by continuous light emitted from the illumination device and by ambient light;
instructions to capture second image data of the object when the object is illuminated by the ambient light substantially without light from the illumination device;
instructions to subtract the second image data from the first image data to form difference image data;
instructions to multiply the difference image data with a power ratio between the continuous light and a pulsed flash, emitted from the illumination device, to form a product;
instructions to add the product to the second image data; and
instructions to determine, based on the first and second image data, a setting for a pulsed flash from the illumination device to be used when capturing a third image of the object in the ambient light.

12. A camera arrangement comprising:
a light source to light to illuminate an object;
an image capturing unit to:
capture first image data of the object when the object is being illuminated by continuous light emitted from the light source and by ambient light, and
capture second image data of the object being illuminated by the ambient light and substantially without light from the light source;
an image processing unit to:
subtract the second image data from the first image data to form difference image data,
multiply the difference image data with a power ratio between the continuous light and a pulsed flash, emitted from the light source, to form a product, and
add the product to the second image data; and
a camera setting unit to determine at least one setting of the camera arrangement based on the difference image data, where the image capturing unit is further to capture third image data of the object using the at least one camera arrangement setting to emit a pulsed flash from the light source to illuminate the object.

13. The camera arrangement of claim 12, where the image processing unit is further to sector the difference image data into a number of zones to form zone-divided difference image data, where each zone corresponds to an average value of brightness values of an associated portion of the difference image data.

14. The camera arrangement of claim 13, where the image processing unit is further to:
sector the second image data into a number of zones to form zone-divided second image data, wherein each zone corresponds to an average value of brightness values of an associated portion of the second image data, and
create a zones-of-interest image by dividing the zone-divided difference image data with the zone-divided second image data.

15. The camera arrangement of claim 13, where the image processing unit is further to apply a threshold value to the zones-of-interest image, and the camera setting unit being further configured to determine the at least one camera setting based further on those ones of the zones that include image data that exceed the threshold value.

16. The camera arrangement of claim 15, further comprising:
a memory to store color characteristics of the light source, where the at least one camera setting comprises white balance, the camera setting unit further to base the determination of the white balance on those ones of the zones that include image data that exceed the threshold value together with the stored color characteristics.

17. The camera arrangement of claim 12, where the light source comprises a light emitting diode.

18. The camera arrangement of claim 12, where the at least one camera setting comprises at least one of exposure time, an aperture parameter, image sensor gain, white balance, or the emitting light from the light source.

19. The camera arrangement of claim 12, where the light source is configured to emit the light at low power when the first image data is captured.

20. The camera arrangement of claim 12, where the camera arrangement resides in a portable electronic device.

21. The camera arrangement of claim 12, where the camera arrangement resides in a mobile terminal.

* * * * *